(12) United States Patent
Feldman et al.

(10) Patent No.: US 11,981,097 B1
(45) Date of Patent: May 14, 2024

(54) PATTERN PRINTING ON PRISMS

(71) Applicant: Apple Inc., Cupertino, CA (US)

(72) Inventors: Alexander Feldman, Los Altos, CA (US); Iain Alexander McAllister, San Jose, CA (US)

(73) Assignee: Apple Inc., Cupertino, CA (US)

( * ) Notice: Subject to any disclaimer, the term of this patent is extended or adjusted under 35 U.S.C. 154(b) by 346 days.

(21) Appl. No.: 17/144,088

(22) Filed: Jan. 7, 2021

Related U.S. Application Data

(60) Provisional application No. 62/959,684, filed on Jan. 10, 2020.

(51) Int. Cl.
*G02B 5/04* (2006.01)
*B29C 35/08* (2006.01)
*B29D 11/00* (2006.01)
*G02B 5/12* (2006.01)

(52) U.S. Cl.
CPC .... *B29D 11/00605* (2013.01); *B29C 35/0894* (2013.01); *G02B 5/045* (2013.01); *G02B 5/12* (2013.01)

(58) Field of Classification Search
CPC .................................. G02B 5/04; G02B 5/045
See application file for complete search history.

(56) References Cited

U.S. PATENT DOCUMENTS

| | | | | |
|---|---|---|---|---|
| 2,976,362 A * | 3/1961 | Stamps | ................... | H04N 1/126 359/211.2 |
| 3,674,339 A | 7/1972 | Sayanagi | | |
| 5,625,436 A * | 4/1997 | Yanagihara | ............... | G03F 9/70 355/53 |
| 5,657,162 A * | 8/1997 | Nilsen | .................... | G02B 5/124 359/530 |
| 7,250,122 B2 | 7/2007 | Mullen | | |
| 7,506,987 B2 | 3/2009 | Nilsen | | |
| 9,244,206 B2 | 1/2016 | Padiyath et al. | | |
| 2011/0310330 A1 * | 12/2011 | Uchida | .............. | G02B 19/0066 349/67 |
| 2014/0016207 A1 * | 1/2014 | Char | ...................... | G02B 5/045 359/625 |
| 2021/0173259 A1 * | 6/2021 | Cho | ................... | G02B 27/0972 |

OTHER PUBLICATIONS

Madhusha, "Difference Between Dry and Wet Etching" https://pediaa.com/difference-between-dry-and-wet-etching/ (Year: 2017).*

* cited by examiner

*Primary Examiner* — Arrie L Reuther
*Assistant Examiner* — Alexander A Wang
(74) *Attorney, Agent, or Firm* — Robert C. Kowert; Kowert, Hood, Munyon, Rankin & Goetzel, P.C.

(57) ABSTRACT

Multi-sided prism printing systems and processes that apply a light-blocking material (e.g., a polymer) to at least part of the surfaces of at least two sides of a prism at the same time. The multi-sided prism printing systems and processes may significantly increase throughput of prism printing when compared to conventional prism printing methods in which only one side of a prism is printed at a time. In addition, the multi-sided prism printing systems and processes may provide a more accurate alignment of the printed patterns on lateral faces of the prism when compared to conventional prism printing methods in which only one lateral face of a prism is printed at a time.

10 Claims, 16 Drawing Sheets

PATTERN PRINTING ON PRISMS

PRIORITY INFORMATION

This application claims benefit of priority of U.S. Provisional Application Ser. No. 62/959,684 entitled "PATTERN PRINTING ON PRISMS" filed Jan. 10, 2020, the content of which is incorporated by reference herein in its entirety.

BACKGROUND

Description of the Related Art

The advent of small, mobile multipurpose devices such as smartphones and tablet or pad devices has resulted in a need for high-resolution, small form factor cameras for integration in the devices. However, due to limitations of conventional camera technology, conventional small cameras used in such devices tend to capture images at lower resolutions and/or with lower image quality than can be achieved with larger, higher quality cameras. Achieving higher resolution with small package size cameras generally requires use of a photosensor with small pixel size and a good, compact imaging lens system. Advances in technology have achieved reduction of the pixel size in photosensors. However, as photosensors become more compact and powerful, demand for compact imaging lens system with improved imaging quality performance has increased.

SUMMARY OF EMBODIMENTS

Embodiments of the present disclosure may provide methods and systems for printing and patterning prisms with a light-blocking material, for example a polymer. A triangular prism includes two bases (the triangular ends) and three lateral faces. Multi-sided prism printing systems and methods are described that apply a polymer to at least two sides of a prism (e.g., two of the three lateral faces of the prism) at the same time. These multi-sided prism printing systems and methods may significantly increase throughput of the prism printing process when compared to conventional methods in which only one side of a prism is printed at a time. In addition, these multi-sided prism printing systems and methods may provide a more accurate alignment of printed patterns on two lateral faces of a prism when compared to conventional methods in which only one lateral face of a prism is printed at a time.

Embodiments of methods and systems for stencil printing patterns on two lateral faces of prisms simultaneously are described. In these methods, a prism bar is placed on a substrate (e.g., a jig) with a second lateral face of the prism bar down and first and third lateral faces of the prism bar facing up. An angled stencil is then aligned with and placed on top of the prism bar. An angled printing head is then moved across the prism bar with attached angled stencil to apply a light-blocking material (e.g., a polymer) to the first and third lateral faces of the prism bar. The angled stencil blocks the material from regions of the first and third lateral faces of two or more prisms to be singulated from the prism bar through which light will pass. In some embodiments, the thickness of the material printed on the first and third lateral faces of the prism bar may be regulated by the thickness of the angled stencil. The angled stencil is removed from the prism bar. In some embodiments, a curing process is then applied to the prism bar to cure the polymer. The prism bar is then singulated into individual prisms. In some embodiments, the angled stencil is configured to leave singulation lines on the prism bar to aid in the singulation process. In some embodiments, one or more of the bases of the singulated prisms may then be coated with a light-blocking material (e.g., a polymer).

In addition, embodiments of methods and systems that apply a photoimageable polymer to multiple sides of prisms and pattern first and third lateral faces of the prisms simultaneously using a photolithography process are described. In these methods, singulated prisms are placed on a substrate (e.g., a jig or tape) with a second lateral face of the prism facing down and the first and third lateral faces facing up. The substrate with the prisms is placed into a coating system. A coating process applies a photoimageable polymer to two or more of the exposed sides of the prisms, including but not limited to the first and third lateral faces. The coating process may, for example, be a spray coating process or a physical vapor deposition (PVD) process. A patterned 2D stencil (e.g., a lithography mask) is then aligned with the prisms. An exposure process is then applied to cure the photoimageable polymer on the exposed surfaces of the prisms through the 2D stencil to pattern the first and third lateral faces of the prisms. An etching process (e.g., a chemical bath or spray-development system) is then applied to remove the polymer from the patterned regions of the first and third lateral faces of the prisms.

Embodiments of prisms produced using the methods and systems described herein may, for example, be used in optical systems for small format factor cameras. Embodiments of a compact optical system are described that may include one or more refractive lens elements, referred to as a lens stack, and one or more prisms that act to fold the optical axis of the optical system. Using one or more prisms to fold the optical axis may reduce the Z-axis dimension of the camera. This has a significant impact on the form factor of the camera by reducing the size of the camera in the Z dimension when compared to conventional small form factor cameras.

Figure 1A:
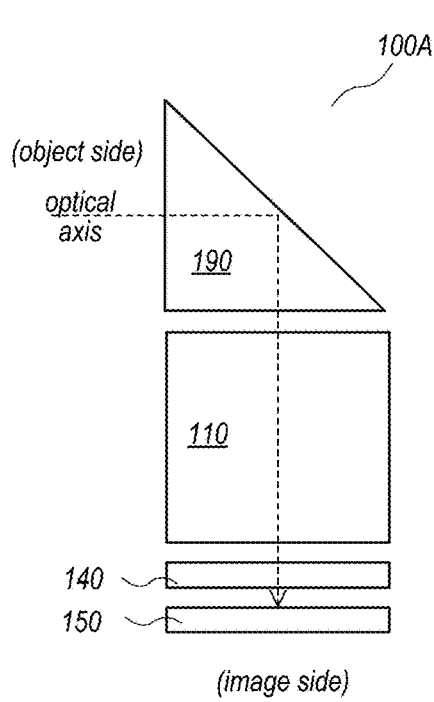
FIG. 1A illustrates a camera lens system with one prism, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ". Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Embodiments of methods and systems for printing and patterning prisms with a light-blocking material, for example a polymer, are described. When using a prism (e.g., a five-sided triangular prism) in an optical system, the surfaces of two or more sides of the prism may be at least partially coated with a material to block or absorb stray light, for example a black polymer. For example, a prism used in an optical system may include five sides; two off-axis sides (the bases of the prism; i.e., sides of the prism that are not on the optical path or axis of the prism) and three on-axis sides (the first, second, and third lateral faces of the prism). The prism may be, but is not necessarily, a right angle prism. Light enters the prism through a first on-axis side, reflects off a second on-axis side, and exits the prism through a third on-axis side. The surfaces of the second on-axis side (referred to herein as the second lateral face) may be coated with a reflective material. The surfaces of the first and third on-axis sides (referred to herein as the first and third lateral faces) may be partially coated (or "masked") with a light-blocking material, for example a polymer, leaving circular, oval, or rectangular openings or "patterns" (clear areas not coated with the light-blocking material) through which light passes. In some embodiments, the surfaces of the two off-axis sides (the bases) may also be coated with a light-blocking material, for example a polymer. In some embodiments, a prism may have chamfered corners, and the surfaces created by the chamfers may also be coated with a light-blocking material, for example a polymer.

Conventional methods for printing patterns with polymer on the lateral faces of prisms include screen printing methods. However, these conventional methods print on only one lateral face of the prism at a time. This slows the process of producing prisms with patterns printed on two lateral faces. In addition, in a conventional process in which the first lateral face of a prism is printed with a pattern (e.g., a clear area or opening through which light passes surrounded by the light-blocking material) and then the third lateral face of the prism is printed with a pattern (e.g., an opening through which light passes surrounded by the light-blocking material), it is difficult to accurately align the two printed patterns on the first and third lateral faces. To ensure optimal optical performance of the prism in an optical system, it is critical that the printed patterns on the first and third lateral faces of the prism are aligned as accurately as possible.

Methods and systems are described that apply a polymer to at least two sides of a prism (e.g., two of the three lateral faces of the prism) at the same time. These multi-sided prism printing systems and methods may significantly increase throughput of the prism printing process when compared to conventional methods in which only one side of a prism is printed at a time. In addition, these multi-sided prism printing systems and methods may provide a more accurate alignment of the printed patterns on the first and third lateral faces of the prism when compared to conventional prism printing methods in which only one lateral face of a prism is printed at a time.

Embodiments of methods and systems for stencil printing patterns on two lateral faces of prisms simultaneously are described. In these methods, a prism bar is placed on a substrate (e.g., a jig) with a second lateral face of the prism bar down and first and third lateral faces of the prism bar facing up. An angled stencil is then aligned with and placed on top of the prism bar. An angled printing head is then moved across the prism bar with attached angled stencil to apply a light-blocking material (e.g., a polymer) to the first and third lateral faces of the prism bar. The angled stencil blocks the material from regions of the first and third lateral faces of two or more prisms to be singulated from the prism bar through which light will pass. In some embodiments, the thickness of the material printed on the first and third lateral faces of the prism bar may be regulated by the thickness of the angled stencil. The angled stencil is removed from the prism bar. In some embodiments, a curing process is then applied to the prism bar to cure the polymer. The prism bar is then singulated into individual prisms. In some embodiments, the angled stencil is configured to leave singulation lines on the prism bar to aid in the singulation process. In some embodiments, one or more of the off-axis sides of the singulated prisms (the bases of the prism) may then be coated with a light-blocking material (e.g., a polymer).

In addition, embodiments of methods and systems that apply a photoimageable polymer to multiple sides of prisms and pattern first and third lateral faces of the prisms simultaneously using a photolithography process are described. In these methods, singulated prisms are placed on a substrate with a second lateral face of the prism facing down and the first and third lateral faces facing up. The substrate with the prisms is placed into a coating system. A coating process applies a photoimageable polymer to two or more of the exposed sides of the prisms, including but not limited to the first and third lateral faces. The coating process may, for example, be a spray coating process or a physical vapor deposition (PVD) process. A patterned 2D stencil (e.g., a lithography mask) is then aligned with the prisms. An exposure process is then applied to cure the photoimageable polymer on the exposed surfaces of the prisms through the 2D stencil to pattern the first and third lateral faces of the prisms. An etching process is then applied to remove the polymer from the patterned regions of the first and third lateral faces of the prisms.

Embodiments of prisms produced using the multi-sided prism printing systems and methods described herein may, for example, be used in optical systems for small format factor cameras. Embodiments of a compact optical system are described that may include one or more refractive lens elements, referred to as a lens stack, and one or more prisms that act to fold the optical axis of the optical system. Using one or more prisms to fold the optical axis may reduce the Z-axis dimension of the camera. This has a significant impact on the form factor of the camera by reducing the size of the camera in the Z dimension when compared to conventional small form factor cameras. For example, in small form factor devices such as smartphones and tablet or pad devices, reducing the Z dimension of the lens system may allow a lens with a long focal length/long optical track length (with narrow field of view) to be used.

Embodiments of small format factor cameras with optical systems that include prisms with two or more sides printed according to the methods and systems as described herein may be implemented in a small package size while still capturing sharp, high-resolution images, making embodiments of the camera suitable for use in small and/or mobile multipurpose devices such as cell phones, smartphones, pad or tablet computing devices, laptop, netbook, notebook, subnotebook, and ultrabook computers, and so on. However, note that aspects of the optical system may be scaled up or down to provide cameras with larger or smaller package sizes. In addition, embodiments of the camera system may be implemented as stand-alone digital cameras. In addition to still (single frame capture) camera applications, embodiments of the camera system may be adapted for use in video camera applications. In addition to visible light camera applications, embodiments of the prisms may be used in infrared camera applications. In some embodiments, a camera as described herein may be included in a device along with one or more other cameras such as a wider-field small format camera or a telephoto or narrow angle small format camera, which would for example allow the user to select between the different camera formats (e.g., normal, telephoto or wide-field) when capturing images with the device. In some embodiments, two or more small format cameras as described herein may be included in a device, for example as front-facing and rear-facing cameras in a mobile device.

Figure 1B:
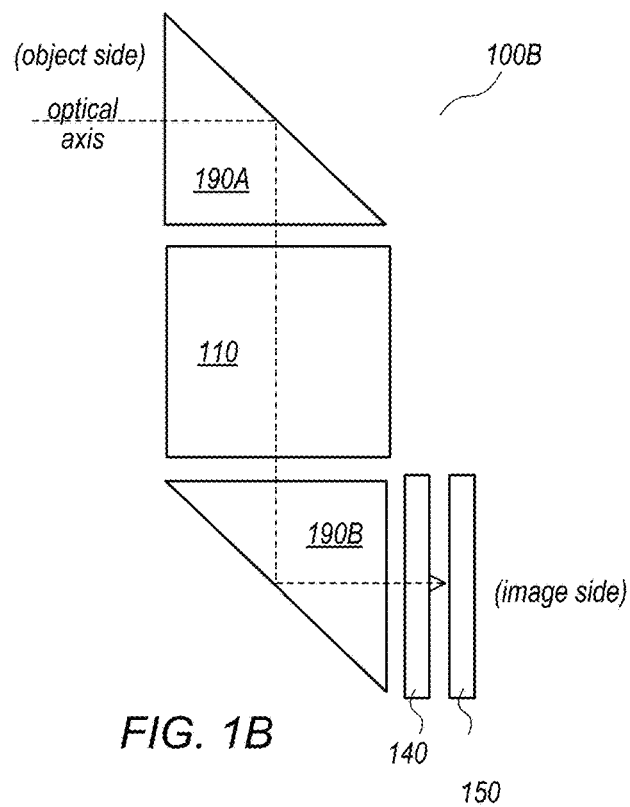
FIG. 1B illustrates a camera lens system with two prisms, according to some embodiments.

An optical system for a camera may include one or more prisms that fold the optical axis of the camera, for example as shown in FIGS. 1A and 1B. FIG. 1A shows an camera 100A that includes, in order from an object side to an image side on an optical axis, a prism 190 that folds the optical axis, a lens stack 110 that includes one or more refractive lens elements, an IR filter 140 (optional), and a photosensor 150. Prism 190 may, but does not necessarily, have optical power. FIG. 1B shows a camera 100B that includes, in order from an object side to an image side on an optical axis, a first prism 190A that folds the optical axis, a lens stack 110 that includes one or more refractive lens element), a second prism 190B that folds the optical axis, an IR filter 140 (optional), and a photosensor 150. One or both prisms 190A and 190B may, but do not necessarily, have optical power. One or both prisms 190A and 190B may be, but are not necessarily right angle prisms.

Figure 1C:
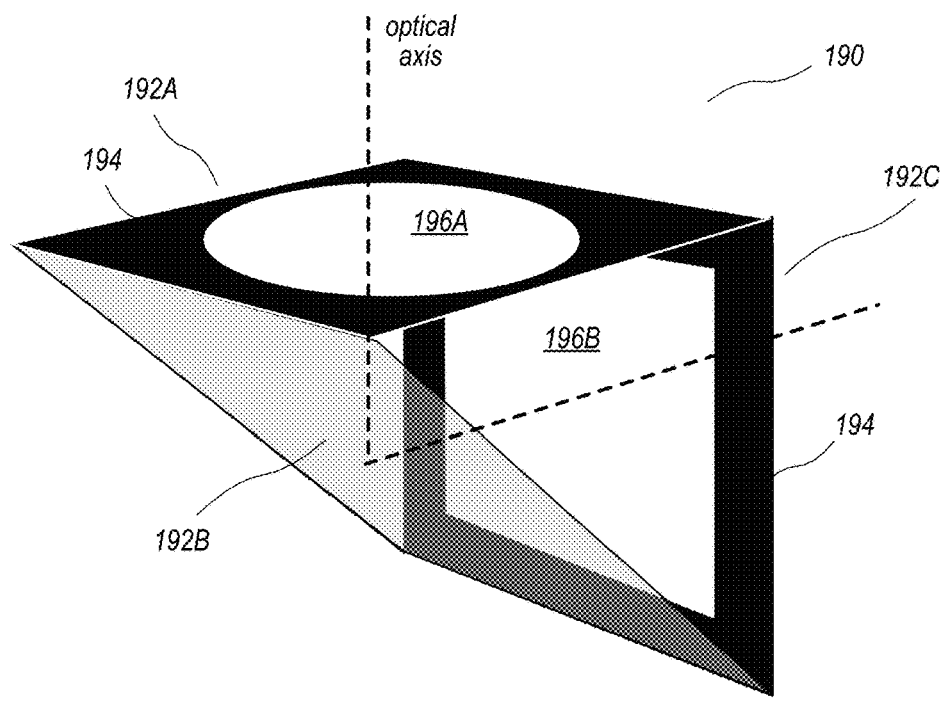
FIG. 1C illustrates a prism with two or more sides at least partially coated with a light-blocking material, according to some embodiments.

FIG. 1C illustrates an example prism 190 that may, for example, be used in an camera as illustrated in FIG. 1A or 1B, according to some embodiments. The prism 190 may be composed of an optical glass or plastic optical material. When used in a camera, light entering lateral face 192A of the prism 190 is redirected by lateral face 192B of the prism, thus folding the optical axis, and exits at lateral face 192C of the prism 190.

When using a prism 190 in an optical system, the surfaces of two or more sides of the prism may be at least partially coated with a material, for example a polymer, to block or absorb light. For example, as shown in FIG. 1C, a triangular prism 190 (e.g., a right angle prism) used in an optical system of a camera may include five sides; two off-axis sides (the bases of the prism 190) and three on-axis sides (the lateral faces of the prism 190). Light enters the prism 190 through a first on-axis side (e.g., lateral face 192A), reflects off a second on-axis side (lateral face 192B), and exits the prism 190 through a third on-axis side (e.g., lateral face 192C). The surface of lateral face 192B may be coated with a reflective material. The surfaces of lateral faces 192A and 192C may be partially coated (or "masked") with a light-blocking material 194, for example a polymer, leaving circular, oval, or rectangular openings 196A and 196B through which light passes. While not shown in FIG. 1C, in some embodiments, the surfaces of the two off-axis sides (the bases of the prism 190) may also be coated with a light-blocking material, for example a polymer. While not shown in FIG. 1C, in some embodiments, a prism 190 may have one or more chamfered corners, and the surfaces created by the chamfering may also be coated with a light-blocking material, for example a polymer.

FIGS. 2A through 2H graphically illustrate a process for stencil printing patterns on two lateral faces of prisms simultaneously, according to some embodiments.

Figure 2A:
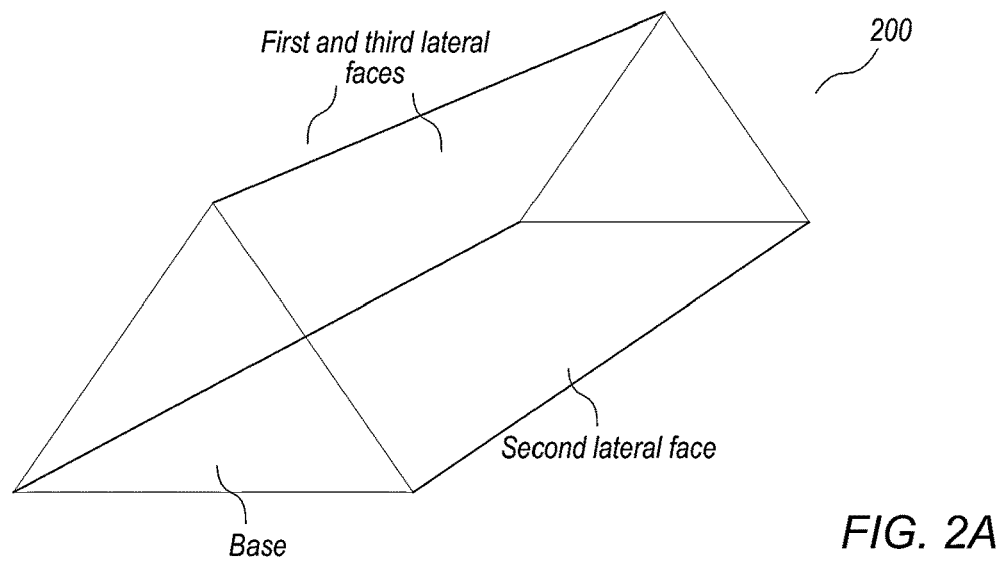
FIGS. 2A through 2H graphically illustrate a process for stencil printing patterns on two lateral faces of prisms simultaneously, according to some embodiments.

FIG. 2A shows a prism bar 200 "blank", according to some embodiments. The prism bar 200 may be formed of an optical glass or plastic material. The prism bar 200 includes first, second, and third lateral faces. In some embodiments, the prism bar may be a right angle prism, with the right angle between the first and third lateral faces. Note that the length of the prism bar 200 is given as an example and is not intended to be limiting.

Figure 2B:
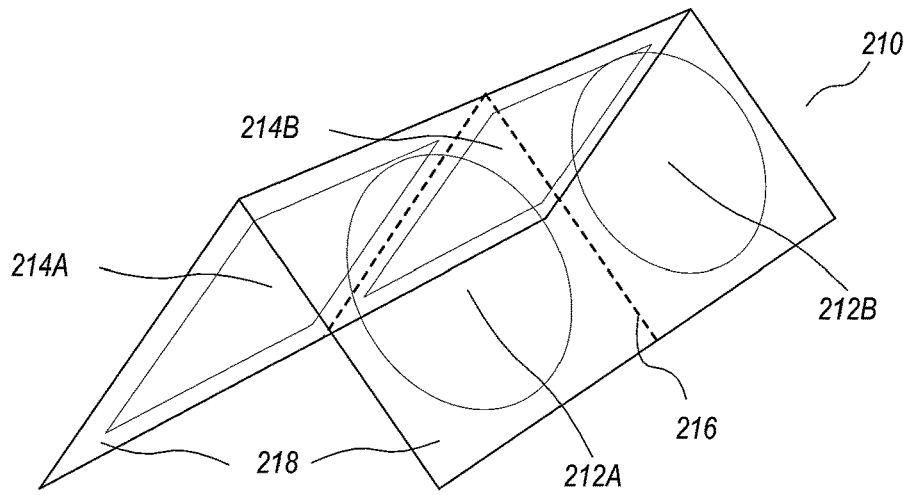
Figure 2C:
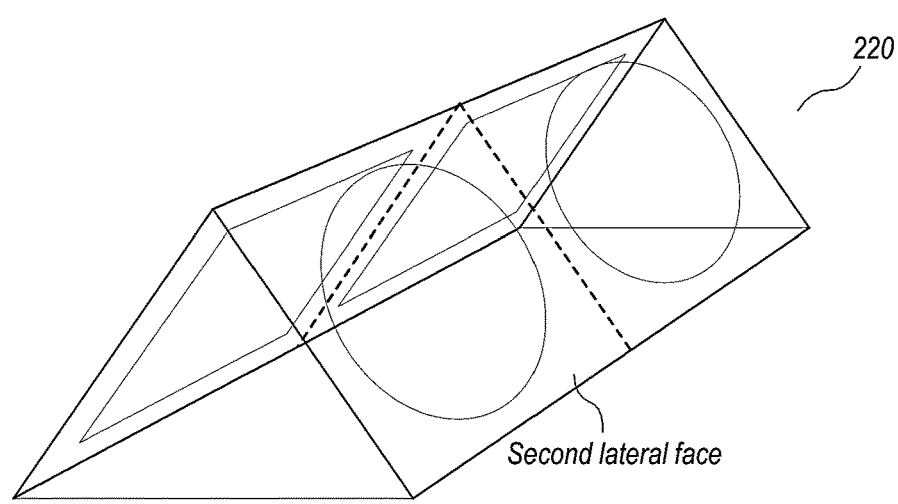

FIG. 2B shows an example angled stencil 210, according to some embodiments. While FIG. 2B shows an example angled stencil 210 for two prisms, note that the angled stencil 210 may be configured for more than two (e.g. 10, 100, etc.) prisms according to the length of the prism bar 200. For each prism section on the prism bar 200 to be printed, the angled stencil 210 includes pattern regions 212 and 214 that block polymer from being applied to corresponding regions of the first and third lateral faces of the prism bar 200, and regions 218 that allow polymer to be applied to corresponding regions of the first and third lateral faces of the prism bar 200. Note that the shapes and sizes of the pattern regions 212 and 214 of the angled stencil 210 are given as examples, and are not intended to be limiting. In some embodiments, the angled stencil 210 may also include a scribe line 216 between each two individual prism sections of the prism bar 200 that provides a mark on the first and third lateral faces of the prism bar 200 that may be used in singulating the prisms. FIG. 2C shows the example angled stencil 210 attached to the prism bar 200 as prism bar assembly 220.

Figure 2D:
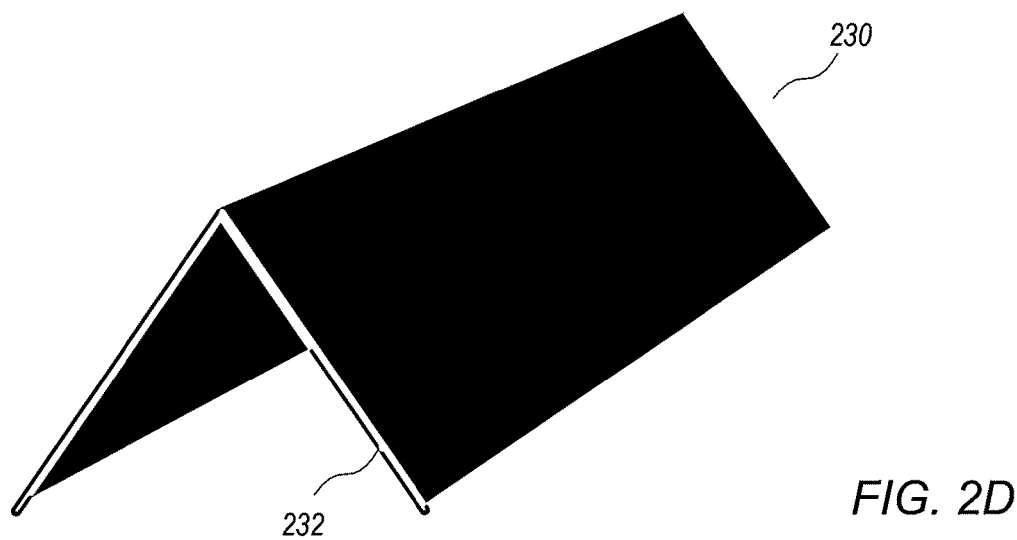

FIG. 2D illustrates an angled print head 230 for applying the polymer to the first and third lateral faces of the prism bar 200 through the angled stencil 210, according to some embodiments. In some embodiments, the angled print head 230 may include a "squeegee" 232 on a leading surface that may help to ensure that the polymer is evenly distributed. Note that the length of the angled print head 230 is given as an example and is not intended to be limiting. Typically, the angled print head 230 will be shorter than the prism bar 200.

Figure 2E:
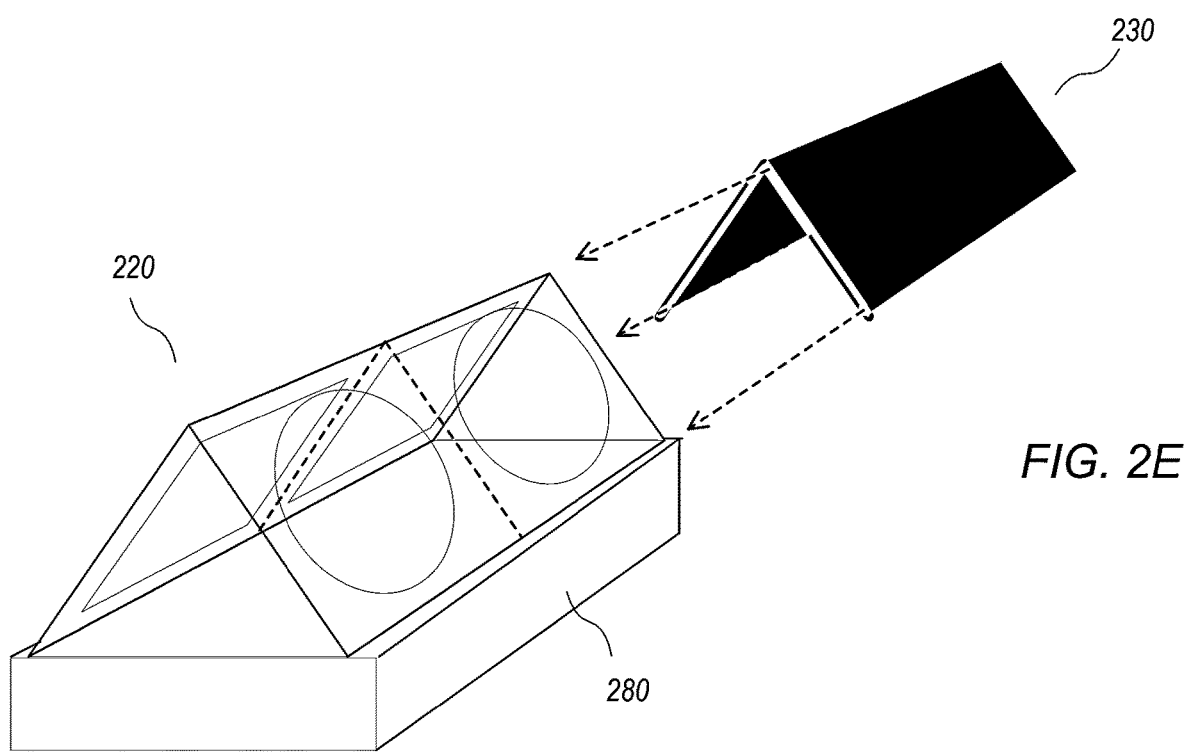
Figure 2F:
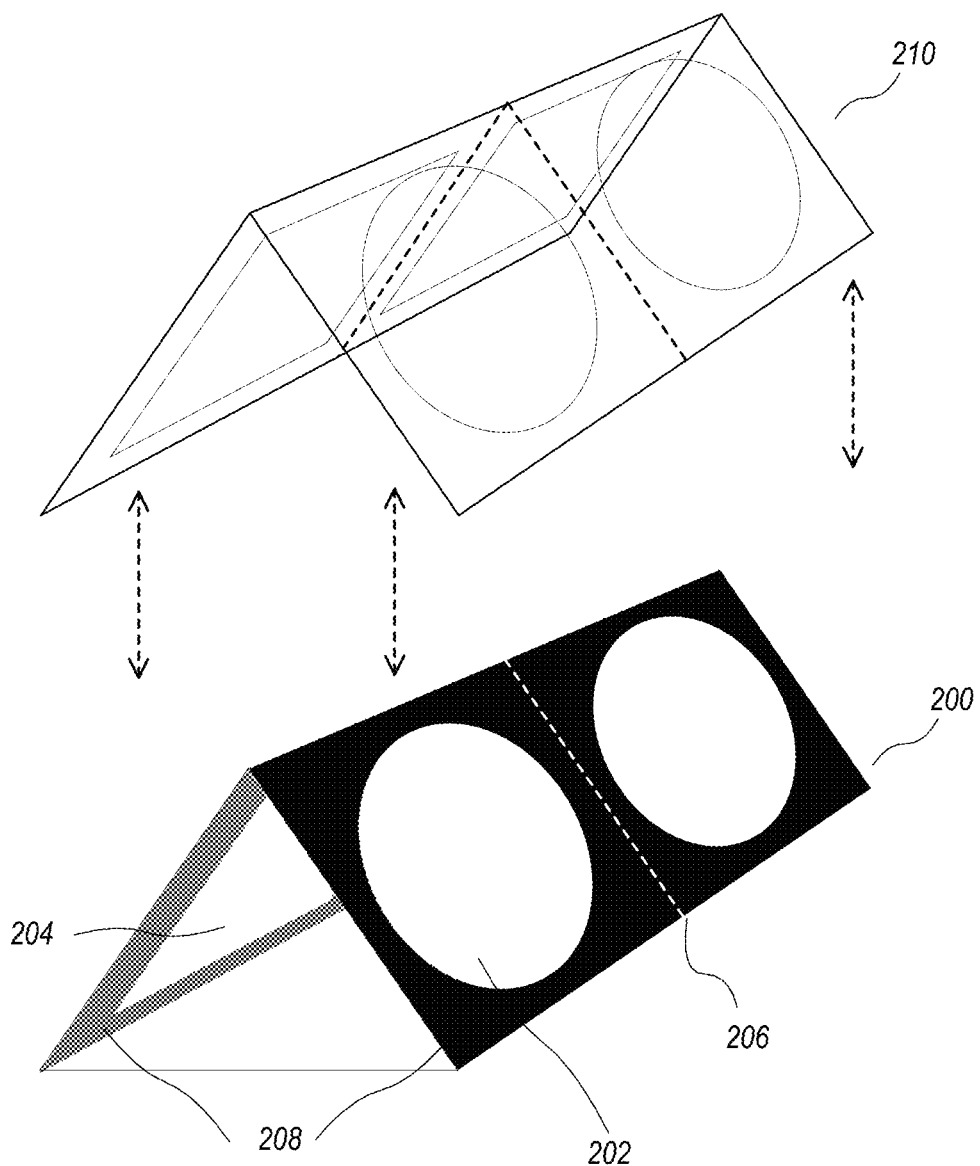

FIG. 2E graphically illustrates a printing process for simultaneously printing two lateral faces of a prism bar 200, according to some embodiments. The prism bar 200 is placed on a substrate 280 with the second lateral face of the prism bar 200 down and the first and third lateral faces of the prism bar 200 facing up. The angled stencil 210 is then aligned with and placed on top of the prism bar 200. The angled printing head 230 is then moved across the prism bar assembly 230 on the substrate 280 to apply a light-blocking material (e.g., a polymer) to the first and third lateral faces of the prism bar 200. The pattern regions 212 and 214 of the angled stencil 210 block the material from corresponding regions of the first and third lateral faces of the prism bar 200, while regions 218 of the angled stencil 210 allow polymer to be applied to corresponding regions of the first and third lateral faces of the prism bar 200. In some embodiments, the angled stencil 210 may also include a scribe line 216 between each two prism sections of the prism bar 200 that provides a mark on the first and/or third lateral faces of the prism bar 200 that may be used in singulating the prisms. After the angled printing head 230 has passed over the entire prism bar assembly 220 on the substrate 280, the angled stencil 210 is removed from the prism bar 200 as shown in FIG. 2F. In some embodiments, to remove the stencil 210, the stencil 210 remains on the same plane, and the jig with the prism bar 200 is moved down. As shown in FIG. 2F, the polymer has been applied to regions 208 of the first and third lateral faces of the prism bar 200 corresponding to regions 218 of the angled stencil 210, and has not been applied to regions 202 and 204 of the first and third lateral faces of the prism bar 200 corresponding to pattern regions 212 and 214 of the angled stencil 210. In addition, stencil lines 206 may be provided on the prism bar 200.

Figure 2G:
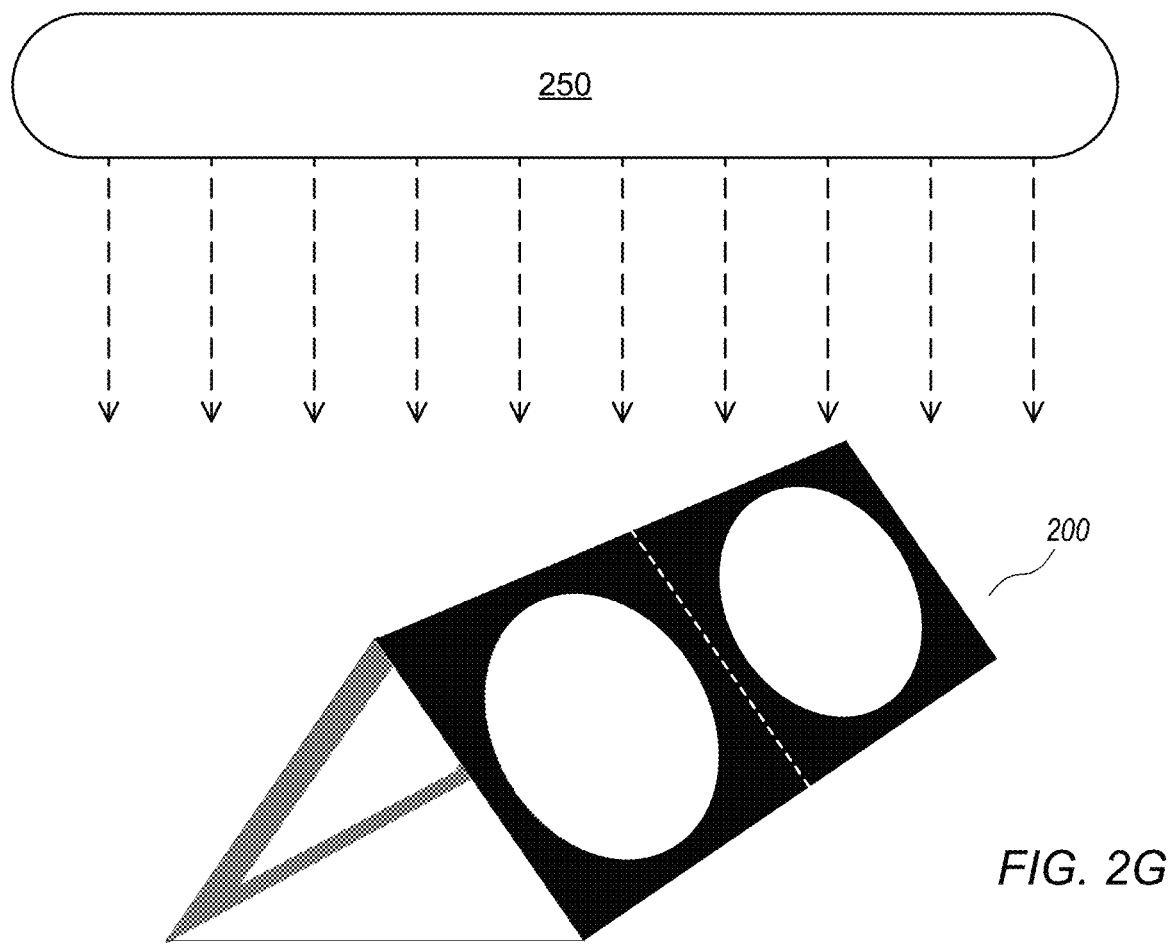

As shown in FIG. 2G, in some embodiments, after removing the angled stencil 210 from the prism bar, a curing process 250 may be applied to the prism bar 200 to rapidly cure the polymer to ensure that the polymer does not spread into regions 202 and 204. Any of various curing methods may be used to cure the polymer. Example curing methods may include, but are not limited to, ultraviolet (UV) curing methods, infrared (IR) curing methods and thermal curing methods.

Figure 2H:
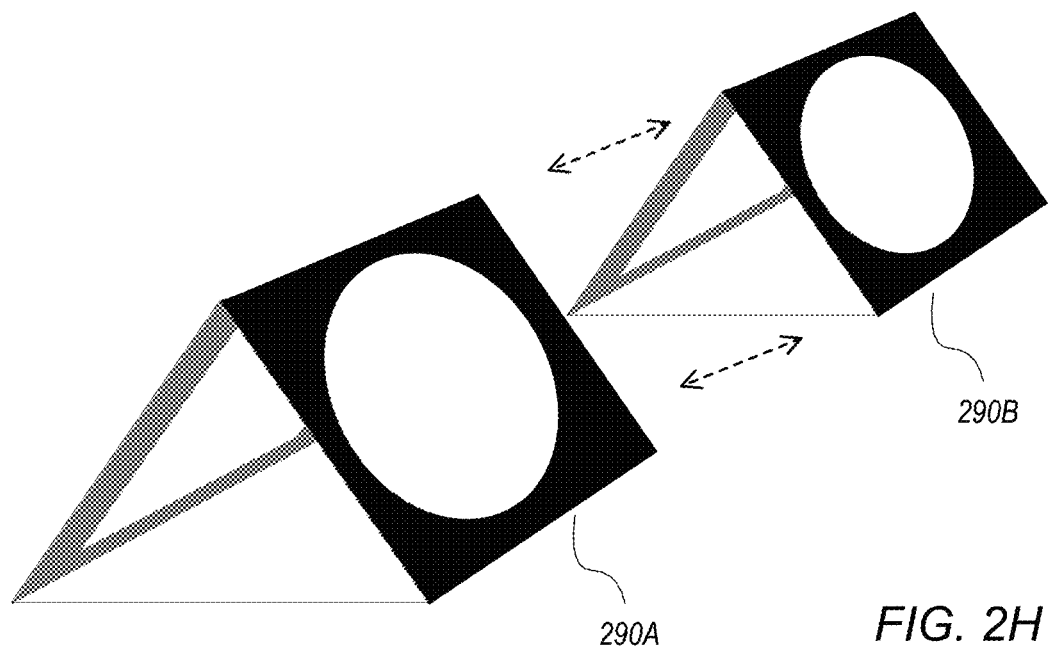

As shown in FIG. 2H, the prism bar 200 is then singulated to generate individual prisms 290. Any of various mechanisms or methods may be used to singulate the prism bar. Example singulation mechanisms or methods may include, but are not limited to, dicing blades, machine sawing, wire dicing, and laser cutting.

While not shown in FIGS. 2A through 2H, in some embodiments, the second lateral face of the prism bar 200 may be coated with a reflective material prior to simultaneously printing the first and third lateral faces of the prism bar 200 using the methods described herein. Alternatively, the second lateral face of the singulated prisms 290 may be coated with a reflective material after the singulation process. In some embodiments, one or both of the off-axis sides of the singulated prisms 290 (the bases of the prisms) may be coated with a light-blocking material after the singulation process.

Figure 3:
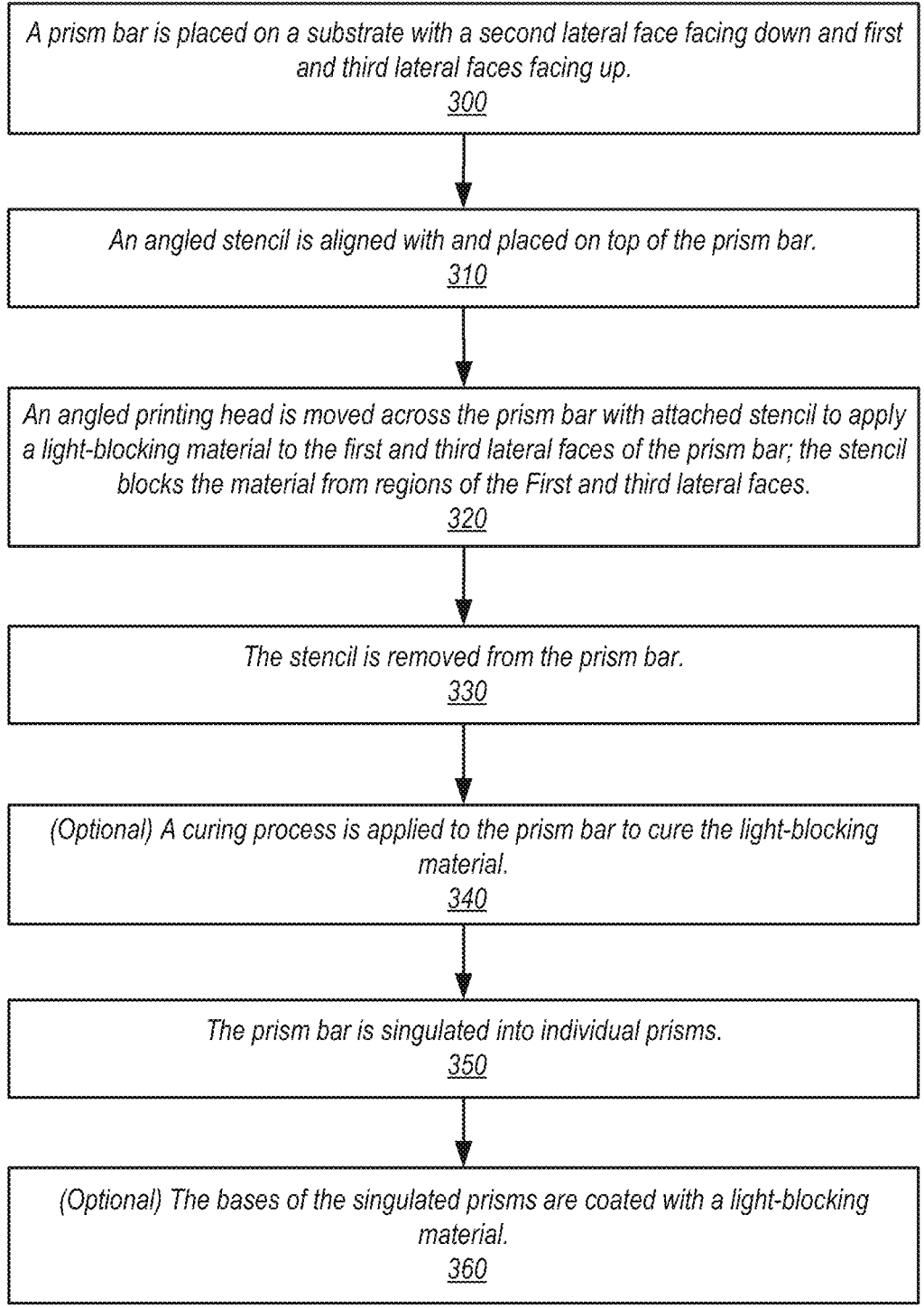
FIG. 3 is a flowchart of a method for printing two lateral faces of prisms with a polymer simultaneously as illustrated in FIGS. 2A through 2H, according to some embodiments.

FIG. 3 is a flowchart of a method for printing two lateral faces of prisms with a polymer simultaneously as illustrated in FIGS. 2A through 2H, according to some embodiments. As indicated at 300, a prism bar is placed on a substrate (e.g., a jig) with a second lateral face of the prism bar down and first and third lateral faces of the prism bar facing up. As indicated at 310, an angled stencil is then aligned with and placed on top of the prism bar. As indicated at 320, an angled printing head is then moved across the prism bar with attached angled stencil to apply a light-blocking material (e.g., a polymer) to the first and third lateral faces of the prism bar. The angled stencil blocks the material from the regions of the first and third lateral faces of the prism sections of the prism bar through which light will pass. In some embodiments, the thickness of the material printed on the first and third lateral faces of the prism bar may be regulated by the thickness of the angled stencil. As indicated at 330, the angled stencil is removed from the prism bar. As indicated at 340, in some embodiments, a curing process is then applied to the prism bar to cure the polymer. As indicated at 350, the prism bar is then singulated into individual prisms. In some embodiments, the angled stencil is configured to leave singulation lines between prism sections on the prism bar to aid in the singulation process. As indicated at 360, in some embodiments, one or more of the off-axis sides of the singulated prisms (the bases of the prisms) may then be coated with a polymer. In some embodiments, the second lateral face of the prism bar may be coated with a reflective material prior to simultaneously printing the first and third lateral faces of the prism bar. Alternatively, the second lateral face of the singulated prisms may be coated with a reflective material after the singulation process.

FIGS. 4A through 4G graphically illustrate a process for applying a photoimageable polymer to multiple sides of singulated prisms and patterning two lateral faces of the prisms simultaneously using a photolithography process, according to some embodiments.

Figure 4A:
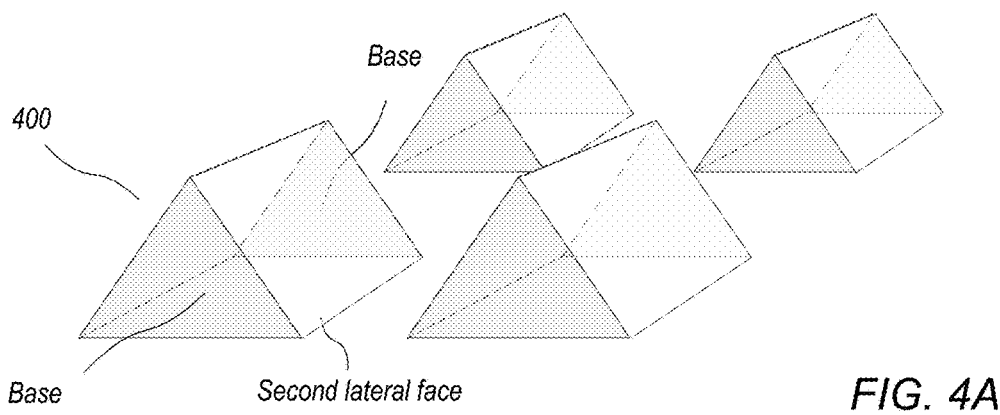
FIGS. 4A through 4G graphically illustrate a process for applying a photoimageable polymer to multiple sides of singulated prisms and patterning two lateral faces of the prisms simultaneously using a photolithography process, according to some embodiments.

FIG. 4A illustrates singulated prisms 400. The singulated prisms 400 may be formed of an optical glass or plastic material. Each prism 400 includes two bases and three lateral faces (a first, second, and third lateral face). In some embodiments, the prisms may be right angle prism, with the right angle between the first and third lateral faces. While not shown in FIG. 4A, in some embodiments, each prism 400 may have one or more chamfered corners. The prisms 400 may be individually produced (e.g., using injection molding or some other method), or may be produced by singulating a prism bar. The singulated prisms 400, prior to the printing process, may be referred to as prism dies.

Figure 4B:
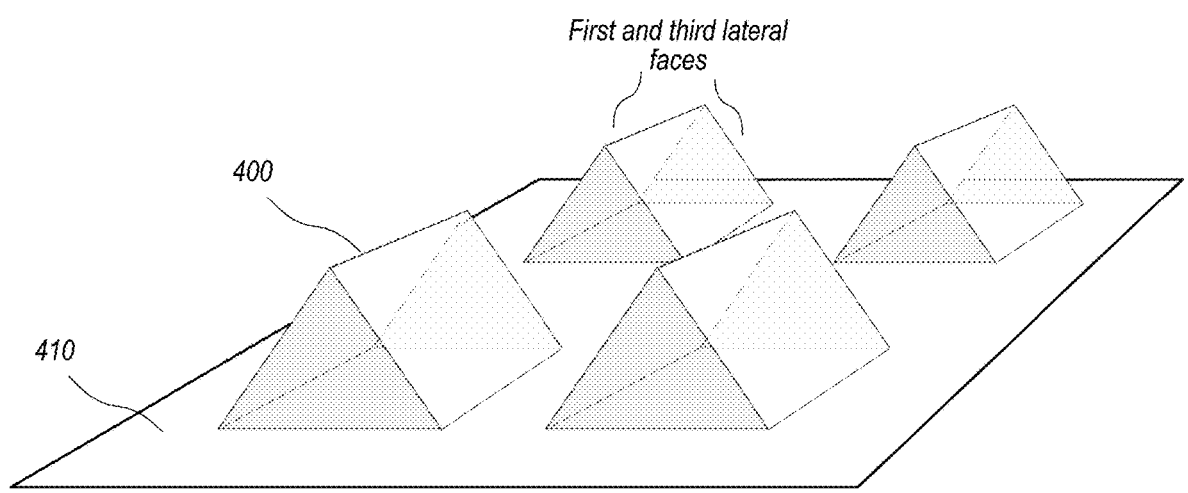

FIG. 4B shows the prisms 400 placed on a substrate 410 (e.g., a jig or tape) with the second lateral face facing down and the first and third lateral faces facing up. The prisms 400 may be arranged on the substrate 410 so as to properly align with a 2D stencil 430 as illustrated in FIGS. 4D and 4E. The number and arrangement of the prisms 400 on the substrate 410 are given as an example for illustrative purposes, and are not intended to be limiting.

Figure 4C:
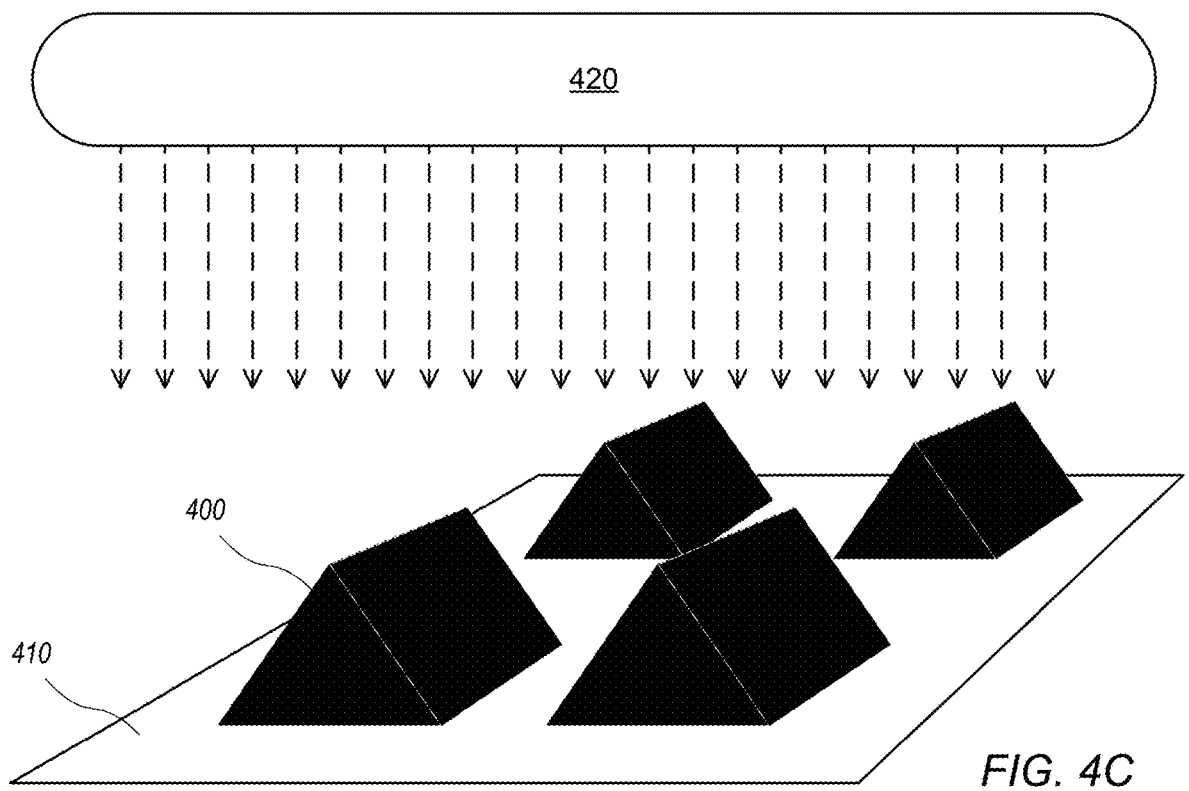
Figure 4D:
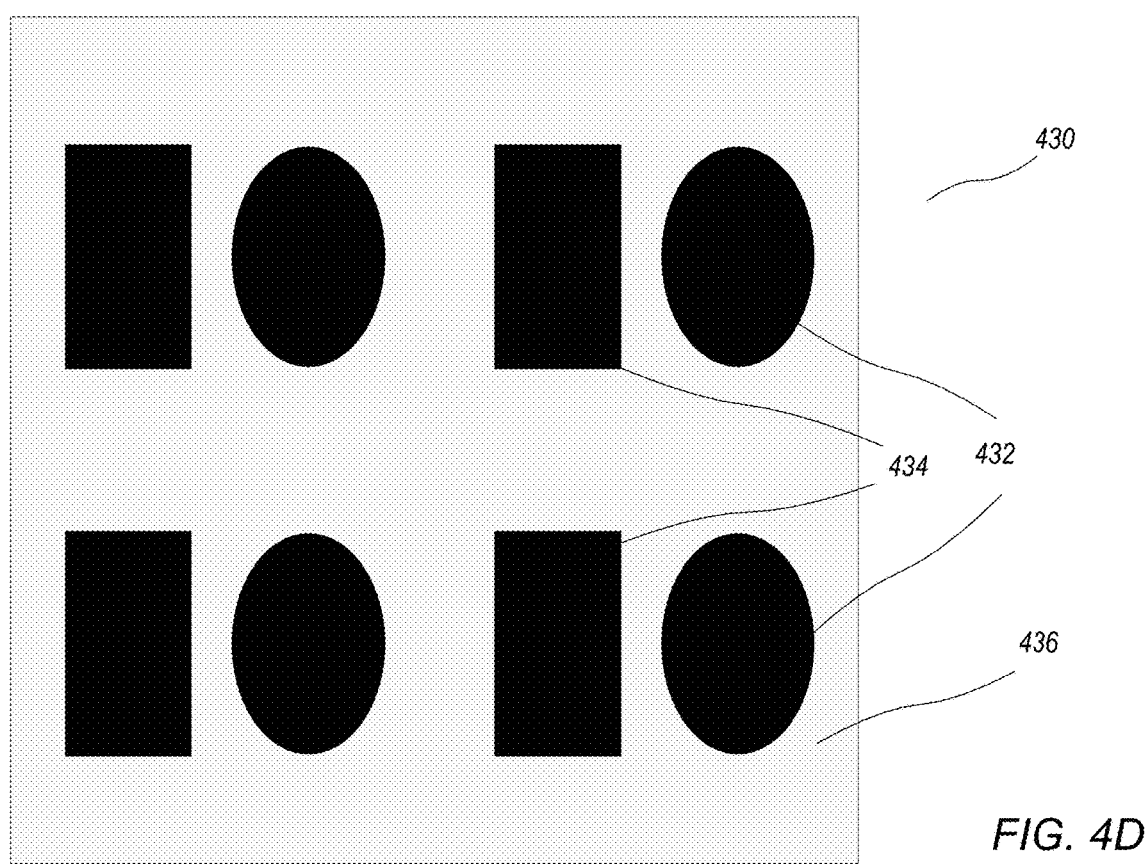
Figure 4E:
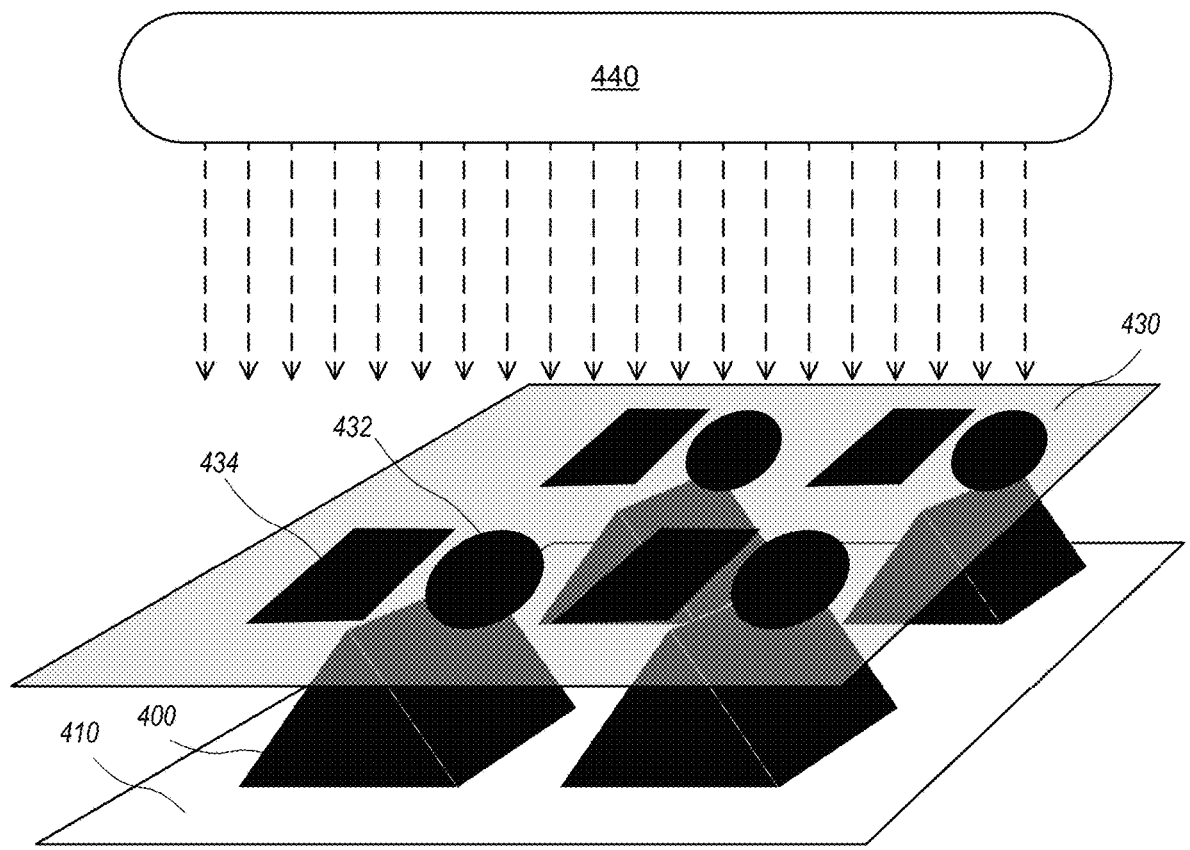

As shown in FIG. 4C, the substrate 410 with the prisms 400 is placed into a coating system 420. The coating system 420 applies a photoimageable polymer to the exposed sides of the prisms 400, including but not limited to the first and third lateral faces. The coating process may, for example, be a spray coating process or a physical vapor deposition (PVD) process.

FIG. 4D illustrates an example 2D stencil 430, according to some embodiments. For each prism 400 on the substrate 410, the 2D stencil includes mask regions 432 and 434 configured to block corresponding regions of the first and third lateral faces of the prism 400 during an exposure process (e.g., using UV light) to cure the photoimageable polymer. Note that the number and shapes of the mask regions 432 and 434 are given by way of example for illustrative purposes, and are not intended to be limiting. Also note that since the stencil 430 is a two-dimensional (2D) stencil while the prisms 400 are 3D objects, the shapes of the 2D mask regions 432 and 434 on the stencil are configured to correctly block the corresponding regions of the first and third lateral faces of the prisms 400 during the exposure process to produce the desired patterns on the first and third lateral faces of the prisms 400 on the substrate 410. In other words, the 2D mask regions 432 and 434 cast "shadows" on the first and third lateral faces of the prisms 400 that correspond to the desired patterns on the first and third lateral faces of the prisms 400; the polymer within these shadows is not cured during the exposure process, while the polymer in the region 436 outside of the shadows is cured.

As shown in FIG. 4E, the patterned 2D stencil 430 (e.g., a lithography mask) is then aligned with the prisms 400 on the substrate 410, and the substrate 410 with prisms 400 coated with the photoimageable polymer is then placed in an exposure system 440. The exposure system 400 applies an exposure process (e.g., using UV light) to cure the photoimageable polymer on the exposed surfaces of the prisms 400 that are not blocked by the mask patterns 432 and 434 of the 2D stencil 430 to correctly pattern the first and third lateral faces of the prisms 400.

Figure 4F:
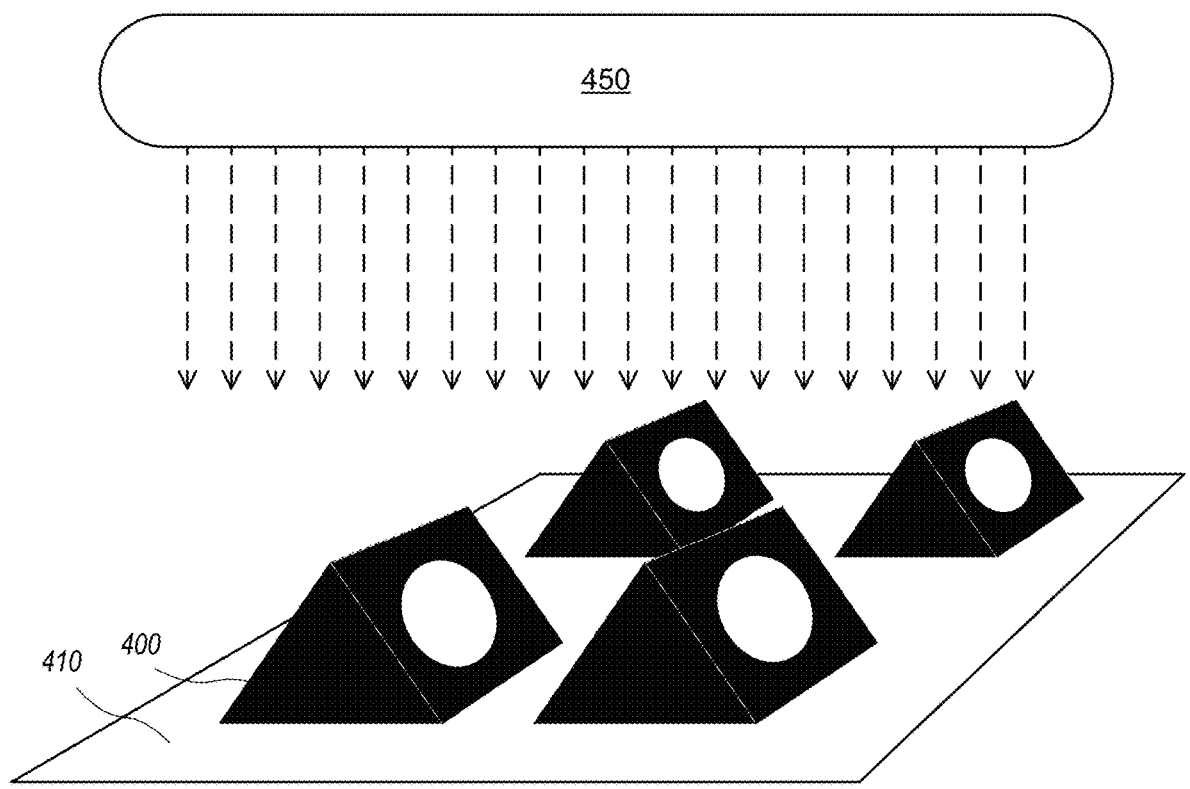

As shown in FIG. 4F, the substrate 410 with prisms 400 is then placed in an etching or development system 450 that applies an etching process (e.g., a chemical bath or spray-development system) to the prisms 400 to remove the uncured polymer from the patterned regions of the first and third lateral faces of the prisms 400 that were not exposed to UV light during the exposure process due to being blocked by corresponding regions 432 and 434 on the 2D stencil 430.

Figure 4G:
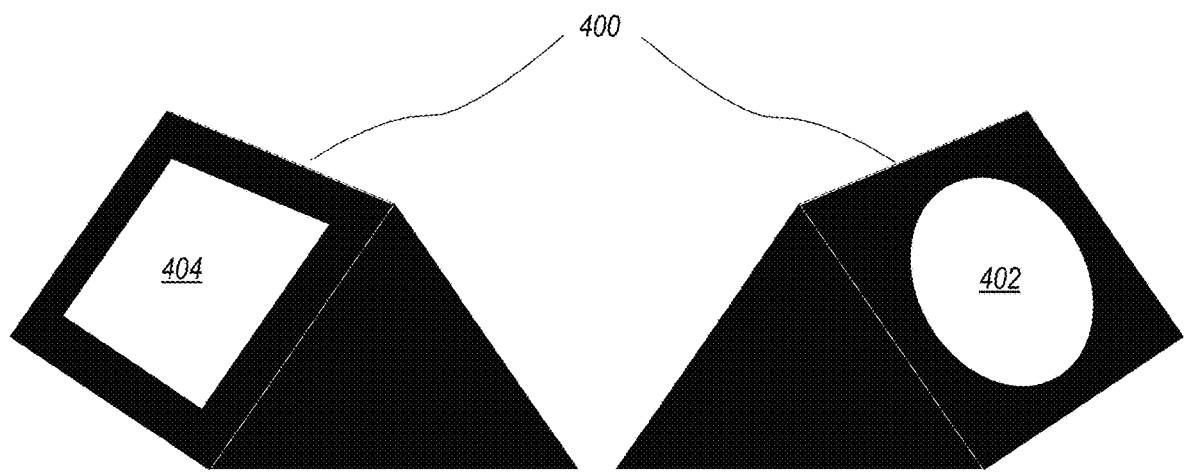

FIG. 4G illustrates an example prism 400 after printing all the sides of the prism 400 with a light-blocking material as illustrated in FIGS. 4A through 4F, according to some embodiments. Regions 402 and 404 on the first and third lateral faces of the prism 400 are not coated with a light-blocking material to allow light to pass through the prism 400. The rest of the prism 400 surfaces excluding the second lateral face (not shown) may also be coated with the cured, light-blocking polymer.

While not shown in FIGS. 4A through 4G, in some embodiments, the second lateral face of the prisms 400 may be coated with a reflective material prior to applying the photoimageable polymer to multiple sides of the singulated prisms 400. Alternatively, the second lateral face of the prisms 400 may be coated with a reflective material after the etching process.

FIGS. 4A through 4G illustrate a process in which multiple prisms 400 are placed on a substrate 410 that is then run through the process to print the multiple prisms 400 simultaneously. The 2D stencil 430 includes multiple patterns 432 and 434 for blocking corresponding regions of first and third lateral faces of the multiple prisms 400 during the exposure process. As an alternative, in some embodiments, a UV exposure head with a single prism 400 2D stencil may be used to expose each prism 400 individually.

Figure 5:
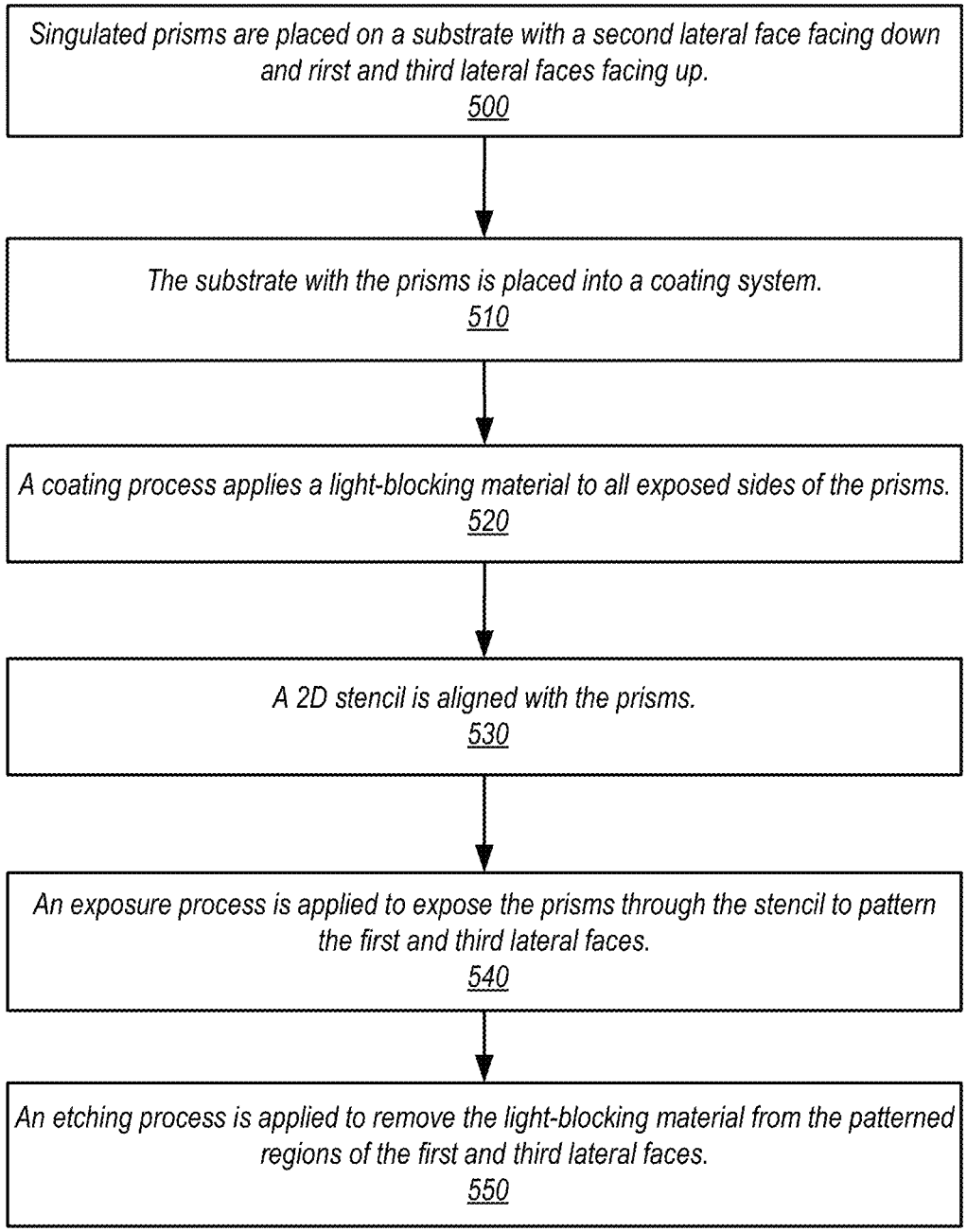
FIG. 5 is a flowchart of a method for applying a photoimageable polymer to multiple sides of singulated prisms and patterning two lateral faces of the prisms simultaneously using a photolithography process as illustrated in FIGS. 4A through 4G, according to some embodiments.

FIG. 5 is a flowchart of a method for applying a photoimageable polymer to multiple sides of singulated prisms and patterning two lateral faces of the prisms simultaneously using a photolithography process as illustrated in FIGS. 4A through 4G, according to some embodiments. As indicated at 500, singulated prisms are placed on a substrate (e.g., a jig or tape) with the second lateral face facing down and the first and third lateral faces facing up. As indicated at 510, the substrate with the prisms is placed into a coating system. As indicated at 520, the coating system applies a photoimageable polymer to the exposed sides of the prisms including but not limited to the first and third lateral faces. The coating process may, for example, be a spray coating process or a physical vapor deposition (PVD) process. As indicated at 530, a patterned 2D stencil (e.g., a lithography mask) is then aligned with the prisms. As indicated at 540, an exposure process (e.g., using UV light) is then applied to cure the photoimageable polymer on the exposed surfaces of the prisms through the 2D stencil to pattern the first and third lateral faces of the prisms. The mask regions of the 2D stencil block corresponding regions of the first and third lateral faces of the prisms during the exposure process. As indicated at 550, an etching process is then applied to remove the polymer from the patterned regions of the first and third lateral faces of the prisms.

In some embodiments, the second lateral face of the prisms may be coated with a reflective material prior to applying the photoimageable polymer to multiple sides of the singulated prisms. Alternatively, the second lateral face of the prisms may be coated with a reflective material after the etching process.

Figure 6:
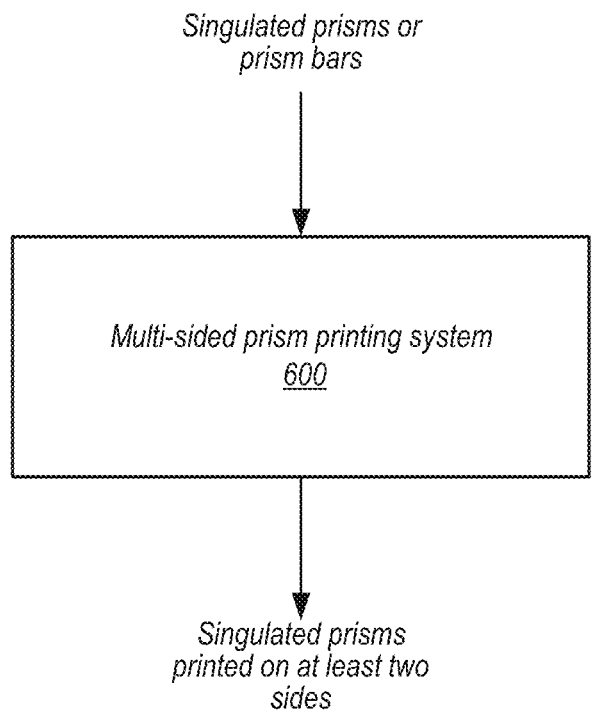
FIG. 6 broadly illustrates a multi-sided prism printing system, according to some embodiments.

FIG. 6 broadly illustrates a multi-sided prism printing system, according to some embodiments. Multi-sided prism printing system 600 may include one or more devices that implement the subsystems and sub-processes of the process for stencil printing patterns on two lateral faces of prisms simultaneously as illustrated in FIGS. 2A through 3. Alternatively, multi-sided prism printing system 600 may include one or more devices that implement the subsystems and sub-processes of the process for applying a photoimageable polymer to multiple sides of singulated prisms and patterning two lateral faces of the prisms simultaneously using a photolithography process as illustrated in FIGS. 4A through 5.

Figure 7:
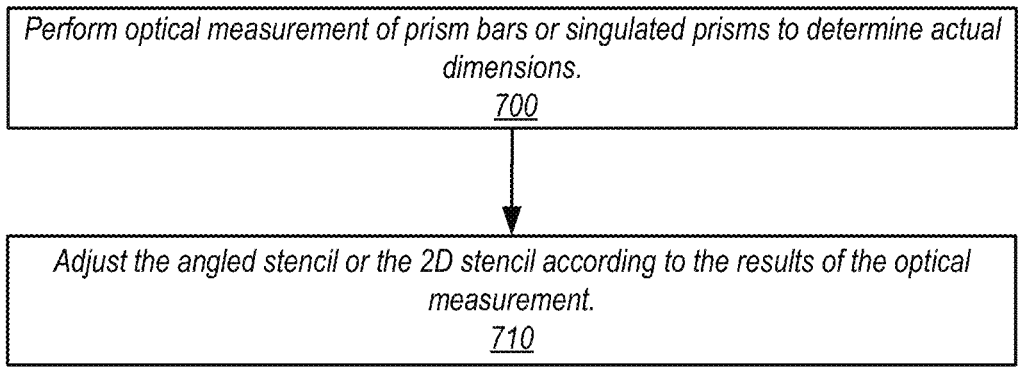
FIG. 7 is a flowchart of a method for adjusting the multi-sided prism printing process according to an optical measurement of the prisms or prism bars, according to some embodiments.

FIG. 7 is a flowchart of a method for adjusting the multi-sided prism printing process according to an optical measurement of the prisms or prism bars, according to some embodiments. The dimensions of prism bars 200 as illustrated in FIG. 2A or of singulated prisms 400 as illustrated in FIG. 4A may vary. Even a variation within a very small tolerance, e.g. @30 microns, may negatively affect the performance of the prisms generated by the multi-sided prism printing system as the printed patterns on the first and third lateral faces of the prisms also need to be properly aligned and spaced with regard to the reflective surface (the second lateral face). Thus, in some embodiments, an optical measurement may be performed on the prism bars or singulated prisms prior to inputting the prism bars or singulated prisms into the multi-sided prism printing system to determine actual dimensions of the prism bars or singulated prisms, as illustrated at 700 of FIG. 7. As illustrated at 710 of FIG. 7, the angled stencil 210 as illustrated in FIG. 2C or the 2D stencil 430 as illustrated in FIG. 4E may be adjusted according to the results of the optical measurement during the respective multi-sided prism printing process to ensure proper alignment of the regions 202 and 204 on the first and third lateral faces of the prism bar with the second lateral face of the prism bar as shown in FIG. 4F or proper alignment of the regions 402 and 404 on the first and third lateral faces of the prisms 400 with the second lateral face of the prisms 400 as shown in FIG. 4G.

Figure 8A:
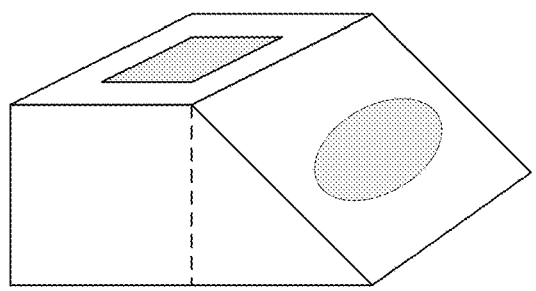
FIGS. 8A through 8D illustrate example alternative shapes for prisms to which embodiments of the pattern printing methods may be applied, according to some embodiments.
Figure 8B:
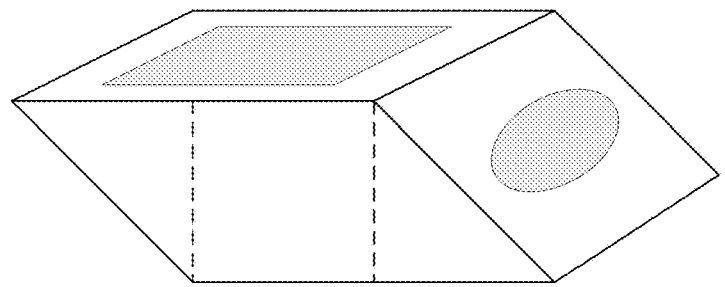
Figure 8C:
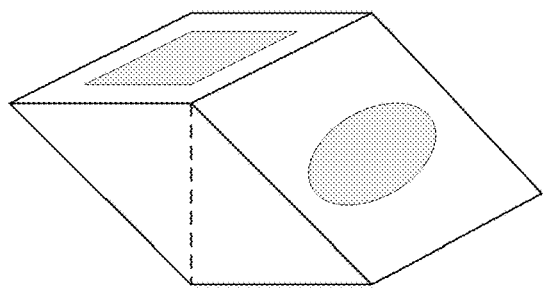
Figure 8D:
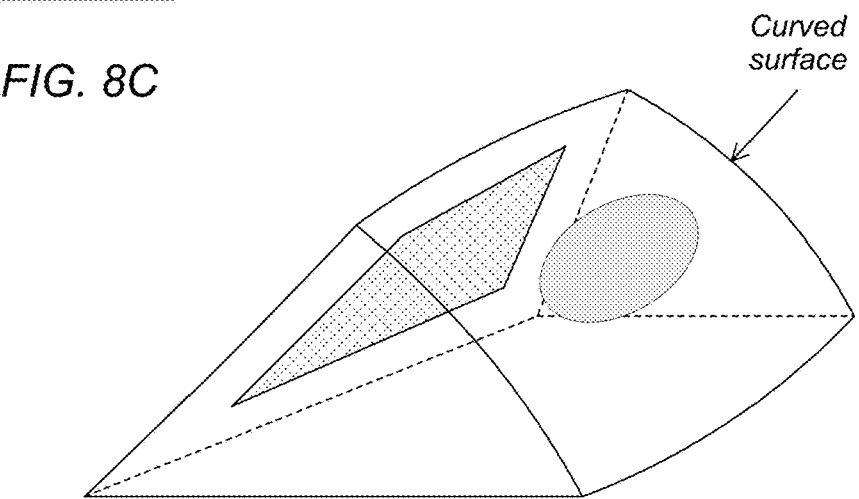

The methods and systems for printing prisms as described herein may be applied to triangular prisms, including but not limited to right angle prisms. While embodiments of methods and systems for printing two or more sides of triangular prisms for use in optical systems are described, the methods and systems may be adapted for use in printing two or more surfaces of other types or shapes of prisms including but not limited to parallelogram-shaped prisms (e.g., rectangle, square, cube or cuboid, rhombus, or rhomboid, trapezoidal, pentagonal, or hexagonal prisms), prisms with four, five, six, or more sides, prisms such as power prisms with one or more curved, concave, convex, aspherical, or irregular surfaces, or of other types of optical elements than prisms such as lenses or flat sheets of glass or plastic. FIGS. 8A through 8D illustrate some non-limiting example alternative shapes for prisms to which embodiments of the pattern printing methods may be applied, according to some embodiments. FIG. 8A shows an example six-sided prism that is not a parallelogram on which two sides have been printed. FIGS. 8B and 8C show example parallelogram prisms on which two sides have been printed. FIG. 8D shows an example triangular power prism in which one of the surfaces is curved. In addition, while embodiments of optical systems for small form factor cameras that include prisms with two or more sides printed with a light-blocking material using the methods and systems described herein are anticipated, prisms or other optical elements printed using the methods and systems described herein may be used in other applications.

EXAMPLE COMPUTING DEVICE

Figure 9:
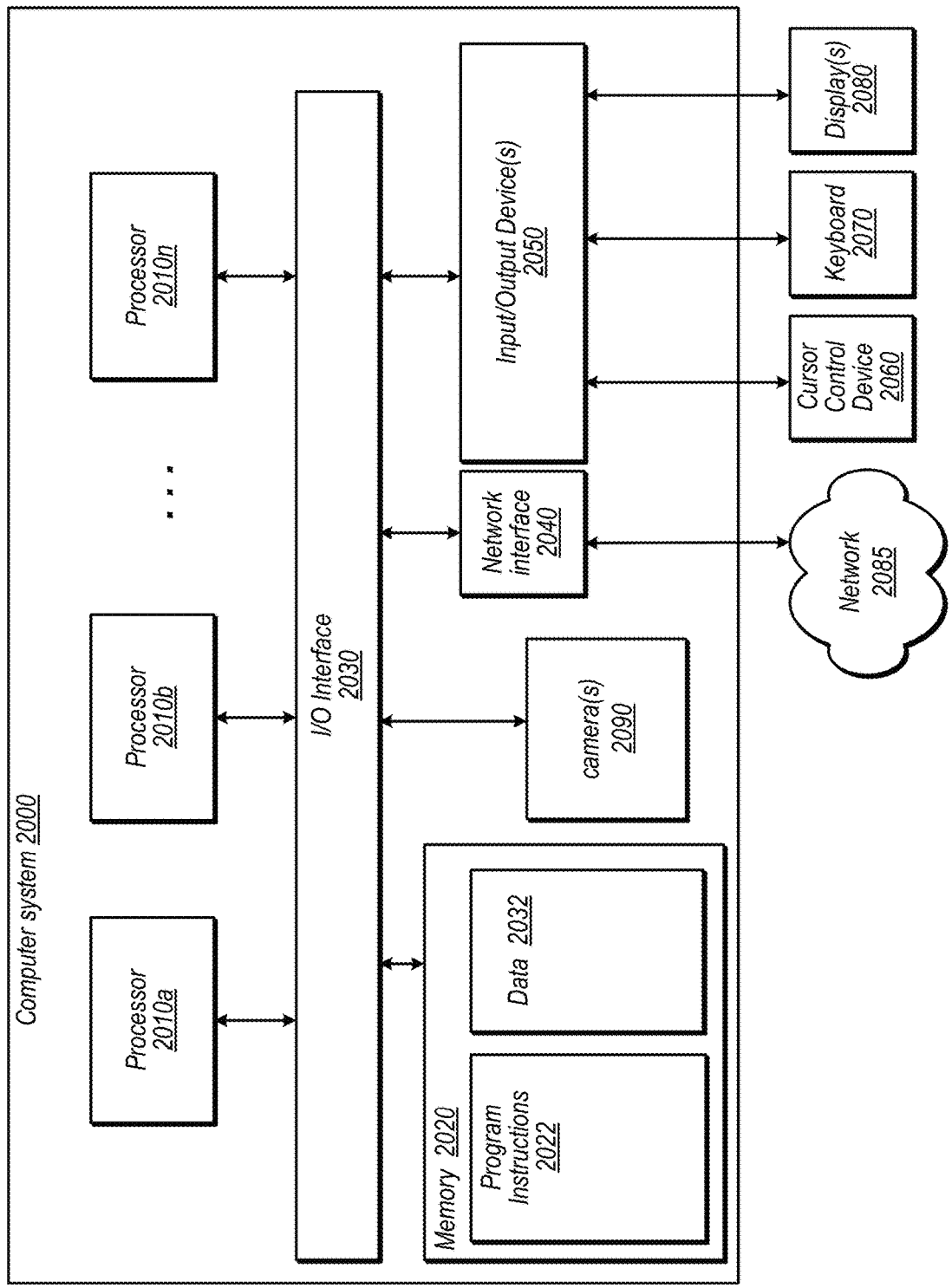
FIG. 9 illustrates an example computer system that may be used in embodiments.

FIG. 9 illustrates an example computing device, referred to as computer system 2000. In some embodiments, a computer system 2000 may implement methods for controlling operations of multi-sided prism printing systems and processes as illustrated in FIGS. 2A through 8. In some embodiments, a computer system 2000 may include or host embodiments of a camera that includes one or more prisms as illustrated in FIGS. 1A-1C. In addition, a computer system 2000 may implement methods for controlling operations of the camera and/or for performing image processing of images captured with the camera. In different embodiments, computer system 2000 may be any of various types of devices, including, but not limited to, a personal computer system, desktop computer, laptop, notebook, tablet or pad device, slate, or netbook computer, mainframe computer system, handheld computer, workstation, network computer, a camera, a set top box, a mobile device, a wireless phone, a smartphone, a consumer device, video game console, handheld video game device, application server, storage device, a television, a video recording device, a peripheral device such as a switch, modem, router, or in general any type of computing or electronic device.

In the illustrated embodiment, computer system 2000 includes one or more processors 2010 coupled to a system memory 2020 via an input/output (I/O) interface 2030. Computer system 2000 further includes a network interface 2040 coupled to I/O interface 2030, and one or more input/output devices 2050, such as cursor control device 2060, keyboard 2070, and display(s) 2080. Computer system 2000 may also include one or more cameras 2090, for example one or more cameras as described above with respect to FIGS. 1A-1C, which may also be coupled to I/O interface 2030.

In various embodiments, computer system 2000 may be a uniprocessor system including one processor 2010, or a multiprocessor system including several processors 2010 (e.g., two, four, eight, or another suitable number). Processors 2010 may be any suitable processor capable of executing instructions. For example, in various embodiments processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

System memory 2020 may be configured to store program instructions 2022 and/or data 2032 accessible by processor 2010. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions 2022 may be configured to implement various interfaces, methods and/or data for controlling operations of camera 2090 and for capturing and processing images with integrated camera 2090 or other methods or data, for example interfaces and methods for capturing, displaying, processing, and storing images captured with camera 2090. In some embodiments, program instructions and/or data may be received, sent or stored upon different types of computer-accessible media or on similar media separate from system memory 2020 or computer system 2000.

In one embodiment, I/O interface 2030 may be configured to coordinate I/O traffic between processor 2010, system memory 2020, and any peripheral devices in the device, including network interface 2040 or other peripheral interfaces, such as input/output devices 2050. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments some or all of the functionality of I/O interface 2030, such as an interface to system memory 2020, may be incorporated directly into processor 2010.

Network interface 2040 may be configured to allow data to be exchanged between computer system 2000 and other devices attached to a network 2085 (e.g., carrier or agent devices) or between nodes of computer system 2000. Network 2085 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 2040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 2050 may, in some embodiments, include one or more display terminals, keyboards, keypads, touchpads, scanning devices, voice or optical recognition devices, or any other devices suitable for entering or accessing data by computer system 2000. Multiple input/output devices 2050 may be present in computer system 2000 or may be distributed on various nodes of computer system 2000. In some embodiments, similar input/output devices may be separate from computer system 2000 and may interact with one or more nodes of computer system 2000 through a wired or wireless connection, such as over network interface 2040.

As shown in FIG. 9, memory 2020 may include program instructions 2022, which may be processor-executable to implement any element or action to support integrated camera 2090, including but not limited to image processing software and interface software for controlling camera 2090. In some embodiments, images captured by camera 2090 may be stored to memory 2020. In addition, metadata for images captured by camera 2090 may be stored to memory 2020.

Those skilled in the art will appreciate that computer system 2000 is merely illustrative and is not intended to limit the scope of embodiments. In particular, the computer system and devices may include any combination of hardware or software that can perform the indicated functions, including computers, network devices, Internet appliances, PDAs, wireless phones, pagers, video or still cameras, etc. Computer system 2000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system 2000 via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 2000 may be transmitted to computer system 2000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

Aspects of at least some embodiments of the invention are further illustrated by the following clauses:

Clause 1: A system for concurrently printing a light-blocking material on at least a portion of the surfaces of two sides of one or more prisms, comprising:
  an angled stencil configured to be placed on top of a prism bar on a substrate with a second lateral base of the prism bar down, wherein the prism bar includes a first lateral face, the second lateral face, and a third lateral face, wherein the angled stencil covers the first lateral face and the second lateral face of the prism bar;
  a printing mechanism comprising an angled print head configured to be passed across the prism bar and angled stencil to apply the light-blocking material to the first lateral face and the second lateral face of the prism bar, wherein patterns on the angled stencil prevent the light-blocking material from being applied to corresponding regions of the first lateral face and the second lateral face of the prism bar;
  a singulation mechanism configured to singulate the prism bar subsequent to removing the angled stencil to produce two or more singulated prisms, each singulated prism having patterns printed on a first lateral face and on a third lateral face of the prism.

Clause 2: The system as recited in clause 1, further comprising a curing mechanism configured to apply a curing process to the prism bar subsequent to removing the angled stencil from the prism bar to cure the light-blocking material.

Clause 3: The system as recited in clause 2, wherein the curing process is one of an ultraviolet (UV) curing process, an infrared (IR) curing process, or a thermal curing process.

Clause 4: The system as recited in clause 1, wherein the angled stencil is configured to provide marks on the prism bar between each two individual prism sections of the prism bar, wherein the marks are used in singulating the prism bar.

Clause 5: The system as recited in clause 1, wherein the singulation mechanism is one of a dicing blade mechanism, a machine sawing mechanism, a wire dicing mechanism, or a laser cutting mechanism.

Clause 6: The system as recited in clause 1, wherein the light-blocking material is a polymer.

Clause 7: A method, comprising concurrently printing a light-blocking material on at least a portion of the surfaces of at least two sides of one or more prisms, wherein said concurrently printing a light-blocking material on at least a portion of the surfaces of at least two sides of one or more prisms comprises:

placing a prism bar on a substrate with a second lateral face of the prism bar down, wherein the prism bar includes a first lateral face, the second lateral face, and a third lateral face;

placing an angled stencil on top of the prism bar, wherein the angled stencil covers the first lateral face and the second lateral face of the prism bar;

passing an angled print head across the prism bar and angled stencil to apply the light-blocking material to the first lateral face and the second lateral face of the prism bar, wherein patterns on the angled stencil prevent the light-blocking material from being applied to corresponding regions of the first lateral face and the second lateral face of the prism bar;

removing the angled stencil from the prism bar; and singulating the prism bar to produce two or more singulated prisms, each singulated prism having patterns printed on a first lateral face and on a third lateral face of the prism.

Clause 8: The method as recited in clause 7, further comprising applying a curing process to the prism bar subsequent to removing the angled stencil from the prism bar to cure the light-blocking material.

Clause 9: The method as recited in clause 7, wherein the angled stencil is configured to provide marks on the prism bar between each two individual prism sections of the prism bar, wherein the marks are used in singulating the prism bar.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A method, comprising:

placing one or more prisms on a substrate; and for respective prisms of the one or more prisms, concurrently printing a light-blocking material on each of two non-parallel sides of the respective prism, the printing comprising concurrently patterning the two non-parallel sides so that on at least a respective region of each of the two sides the light-blocking material remains, and for at least a respective different region of each of the two respective sides the light-blocking material is removed or is blocked from the respective different region, wherein said concurrently printing the light-blocking material on each of two non-parallel sides of the respective prism comprises:

placing two or more prisms on the substrate with a respective second lateral face of each of the prisms down, wherein each prism has at least five sides including a first lateral face, the second lateral face, a third lateral face, and two bases;

applying a coating process to the prisms on the substrate, wherein the coating process applies a photo-imageable polymer to two or more exposed sides of the respective prisms including the first and third lateral faces of the respective prisms;

aligning a patterned 2D stencil with the prisms on the substrate, wherein, for each prism on the substrate, the 2D stencil includes mask regions configured to block corresponding regions of the respective first and third lateral faces of the respective prisms during an exposure process;

applying an exposure process to cure the photoimageable polymer on the exposed surfaces of the prisms through the 2D stencil to pattern the prism surfaces, wherein the mask regions of the 2D stencil block corresponding regions of the respective first and third lateral faces of the respective prisms during the exposure process; and applying an etching process to remove the polymer from the patterned regions of the respective first and third lateral faces of the respective prisms.

2. The method as recited in claim 1, wherein said concurrently printing a light-blocking material on each of two non-parallel sides of the respective prism comprises concurrently printing patterns with the light-blocking material on two of the three lateral faces of the one or more prisms, wherein the patterns include clear areas through which light enters or exits the respective prism at least partially enclosed by the light-blocking material.

3. The method as recited in claim 2, wherein concurrently printing patterns with the light-blocking material on two of the three lateral faces of the one or more prisms comprises using a stencil to print the patterns.

4. The method as recited in claim 3, further comprising, prior to said using a stencil to print the patterns:

performing an optical measurement of the one or more prisms; and adjusting the stencil for at least one prism according to results of the optical measurement.

5. The method as recited in claim 2, wherein said concurrently printing a light-blocking material on each of two non-parallel sides of the respective prism further comprises concurrently applying the light-blocking material to the two bases of the prism.

6. The method as recited in claim 1, wherein the light-blocking material is a polymer.

7. The method as recited in claim 1, wherein the prisms are formed of an optical glass or plastic material.

8. The method as recited in claim 1, wherein the coating process is one of a spray coating process or a physical vapor deposition (PVD) process.

9. The method as recited in claim 1, wherein the exposure process uses ultraviolet (UV) light to cure the photoimageable polymer on the exposed surfaces of the prisms through the 2D stencil.

10. The method as recited in claim 1, wherein the etching process is a chemical bath.

* * * * *